(12) United States Patent
Fu et al.

(10) Patent No.: US 11,353,744 B2
(45) Date of Patent: Jun. 7, 2022

(54) BACKLIGHT MODULE AND DISPLAY DEVICE

(71) Applicant: HUIZHOU CHINA STAR OPTOELECTRONICS TECHNOLOGY CO., LTD., Guangdong (CN)

(72) Inventors: Linlin Fu, Guangdong (CN); Dehua Li, Guangdong (CN)

(73) Assignee: HUIZHOU CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 407 days.

(21) Appl. No.: 16/492,312

(22) PCT Filed: Aug. 16, 2019

(86) PCT No.: PCT/CN2019/101110
§ 371 (c)(1),
(2) Date: Sep. 9, 2019

(87) PCT Pub. No.: WO2020/248358
PCT Pub. Date: Dec. 17, 2020

(65) Prior Publication Data
US 2021/0364858 A1    Nov. 25, 2021

(30) Foreign Application Priority Data
Jun. 14, 2019   (CN) .......................... 201910519555.X

(51) Int. Cl.
*G02F 1/33* (2006.01)
*G02F 1/13357* (2006.01)

(52) U.S. Cl.
CPC .. *G02F 1/133606* (2013.01); *G02F 1/133608* (2013.01); *G02F 1/133603* (2013.01)

(58) Field of Classification Search
CPC ......... G02F 1/133606; G02F 1/133608; G02F 1/133603
See application file for complete search history.

(56) References Cited

U.S. PATENT DOCUMENTS

| | | | |
|---|---|---|---|
| 2007/0103908 A1* | 5/2007 | Tabito ............... | G02F 1/133608 362/294 |
| 2014/0036160 A1* | 2/2014 | Lin ................... | G02F 1/133603 348/739 |
| 2015/0241004 A1* | 8/2015 | Oberschmid ............ | F21K 9/60 362/84 |

FOREIGN PATENT DOCUMENTS

| | | |
|---|---|---|
| CN | 1924620 A | 3/2007 |
| CN | 101783340 A | 7/2010 |
| CN | 102207565 A | 10/2011 |
| CN | 102221169 A | 10/2011 |
| CN | 103574514 A | 2/2014 |
| CN | 204666845 U | 9/2015 |

(Continued)

*Primary Examiner* — Julie A Bannan
(74) *Attorney, Agent, or Firm* — Benesch, Friedlander, Coplan & Aronoff LLP

(57) ABSTRACT

A backlight module and a display device are provided. The backlight module includes a glass back plate. The glass back plate includes a flat portion and at least one scattering portion disposed on the flat portion. An inner surface of the at least one scattering portion is provided with a diffusion layer. The backlight module and the display device can simplify a process of the backlight module and improve an assembly performance.

10 Claims, 2 Drawing Sheets

(56) References Cited

FOREIGN PATENT DOCUMENTS

| CN | 106547042 A | 3/2017 |
|---|---|---|
| CN | 206178183 U | 5/2017 |
| CN | 206378615 U | 8/2017 |

\* cited by examiner

BACKLIGHT MODULE AND DISPLAY DEVICE

CROSS REFERENCE TO RELATED APPLICATION

This application claims the priority of International Application No. PCT/CN2019/101110, filed on 2019 Aug. 16, which claims priority to Chinese Application No. 201910519555.X filed on 2019 Jun. 14. The entire disclosures of each of the above applications are incorporated herein by reference.

FIELD OF INVENTION

The present disclosure relates to the field of display technologies, and more particularly to a backlight module and a display device.

BACKGROUND OF INVENTION

Compared with conventional metal, glass has advantages of smooth surface, smooth screen printing, and different appearance patterns, therefore, it is gradually applied to backlight modules.

Current backlight modules are mainly direct type structures, and generally each include a glass back plate, a light guide plate, and an optical film. The light guide plate and the optical film are sequentially disposed on the glass back plate.

The current backlight module needs to assemble the light guide plate and the optical film, which results in a complicated process of the backlight module and reduces assembly performance.

SUMMARY OF INVENTION

An object of an embodiment of the present disclosure is to provide a backlight module and a display device, which can simplify a process of the backlight module and improve an assembly performance.

In order to solve the above technical problem, an embodiment of the present disclosure provides a backlight module. The backlight module includes a glass back plate. The glass back plate includes a flat portion and at least one scattering portion disposed on the flat portion. An inner surface of the at least one scattering portion is provided with a diffusion layer.

An embodiment of the present disclosure further provides a display device including the above backlight module.

In the embodiment, the backlight module and the display device are provided. The backlight module includes the glass back plate. The glass back plate includes the flat portion and at least one scattering portion disposed on the flat portion. The inner surface of the at least one scattering portion is provided with the diffusion layer.

Beneficial effects of an embodiment of the present disclosure are that, because the at least one scattering portion is added on the flat portion and the diffusion layer is disposed on the inner surface of the at least one scattering portion, scattering of a backlight source is facilitated, a light guide plate and an optical film are saved, a process of the backlight module is simplified, and an assembly performance is improved.

DETAILED DESCRIPTION OF PREFERRED EMBODIMENTS

Figure 1:
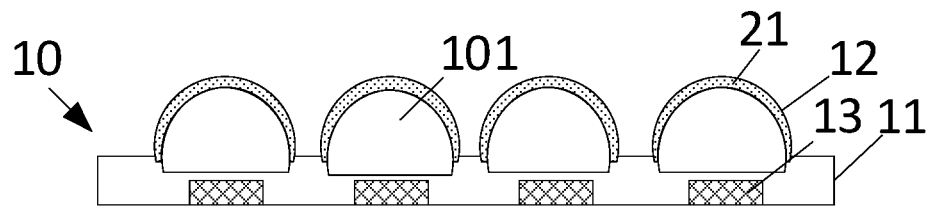
FIG. 1 is a first schematic structural diagram of a backlight module according to a first embodiment of the present disclosure.

The following description of the various embodiments is provided to illustrate the specific embodiments of the present disclosure. The directional terms mentioned in the present disclosure, such as "upper", "lower", "before", "after", "left", "right", "inside", "outside", "side", etc., are merely the directions referring to the additional drawings. Therefore, the directional terminology used is for the purpose of illustration and understanding of the present disclosure. In the figures, structurally similar elements are denoted by the same reference numerals.

Figure 2:
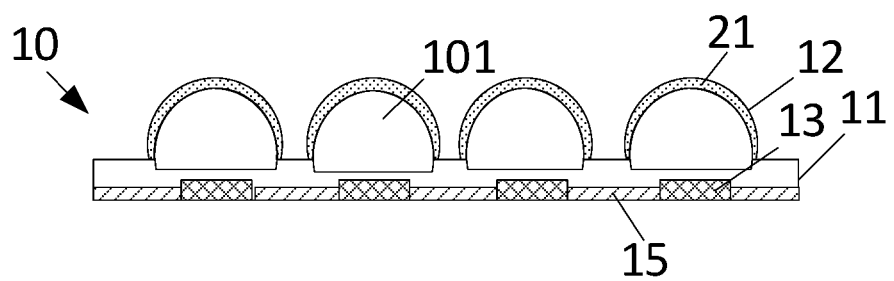
FIG. 2 is a second schematic structural diagram of a backlight module according to the first embodiment of the present disclosure.

Referring to FIG. 1 and FIG. 2, FIG. 1 is a first schematic structural diagram of a backlight module according to a first embodiment of the present disclosure.

As illustrated in FIG. 1, a backlight module 10 of an embodiment includes a glass back plate including a flat portion 11 and four scattering portions 12. The scattering portion 12 is disposed on the flat portion 11. An inner surface of the scattering portions 12 is provided with a diffusion layer 21. It is to be understood that a number of the scattering portions 12 is not limited thereto and may be one or more.

The backlight module further includes at least one light bar 13. The at least one light bar 13 corresponds to a position of the scattering portions 12. In an embodiment, the at least one light bar 13 is in one-to-one correspondence with the scattering portions 12. In another embodiment, the scattering portions 12 correspond to one light bar 13. The light bar 13 can be a light emitting diode (LED) light bar.

In order to increase utilization of light, the glass back plate has a receiving cavity 101 in which the light bar 13 is disposed. For example, in one embodiment, the glass back plate is hollow, that is, hollow between an upper surface and a lower panel of the glass back plate, and the light bar 13 is fixed on a bottom of the flat portion 11. It can be understood that in other embodiments, the light bar 13 can also be disposed outside the glass back plate. In another embodiment, the glass back plate is a solid structure, and a groove may be provided at a position where the light bar is disposed to mount the light bar therein.

As illustrated in FIG. 2, in order to improve the utilization of light, the inner surface of the bottom of the flat portion 11 is provided with a reflective layer 15, an orthographic projection of the reflective layer 15 on the bottom of the flat portion 11 does not overlap with an orthographic projection of the light bar on the bottom of the flat portion 11.

A shape of the scattering portion 12 is the same as a shape of a lens. In an embodiment, a cross-sectional shape of the scattering portion 12 includes at least one of a semicircular shape and an elliptical shape. It is understood that the cross-sectional shape of the scattering portion may be other shapes. The cross-sectional shape is a longitudinal cross-sectional shape. An outer surface of the scattering portion 12 may also be provided with the diffusion layer.

Because the scattering portion is added on the flat portion and the diffusion layer is disposed on the inner surface of the scattering portion, a backlight source is scattered, and a light guide plate and an optical film are saved, thereby simplifying a manufacturing process of the backlight module and improving an assembly performance. In addition, because more light bars can be disposed, power of the light bar itself can be reduced, thereby reducing heat generation and avoiding excessive temperature of the backlight module.

Figure 3:
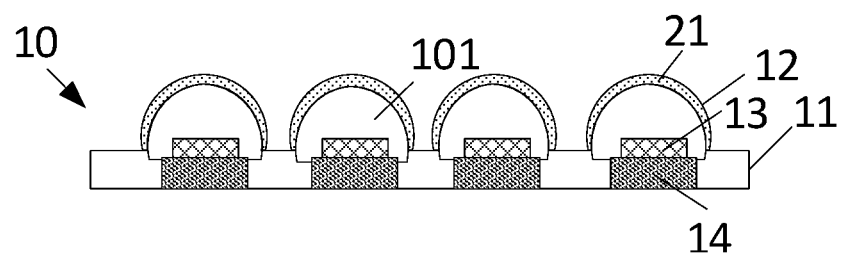
FIG. 3 is a first schematic structural diagram of a backlight module according to a second embodiment of the present disclosure.
Figure 4:
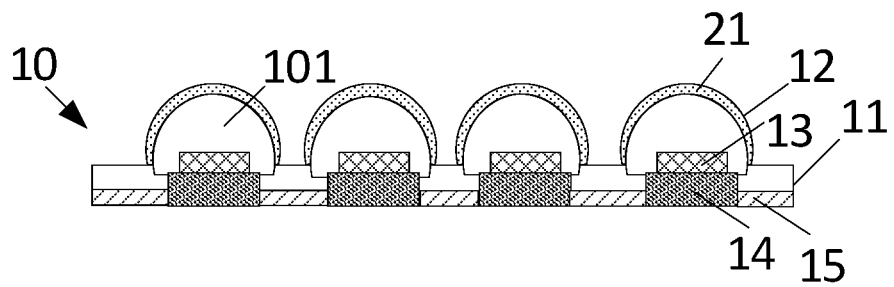
FIG. 4 is a second schematic structural diagram of a backlight module according to the second embodiment of the present disclosure.

Referring to FIG. 3 and FIG. 4, FIG. 3 is a first schematic structural diagram of a backlight module according to a second embodiment of the present disclosure.

As illustrated in FIG. 3, the backlight module of this embodiment is different from the previous embodiment in that the light bar 13 of this embodiment is fixed to the bottom of the flat portion 11 by a support member 14. A height of the light bar 13 is greater than or equal to a height of the flat portion 11.

Figure 5:
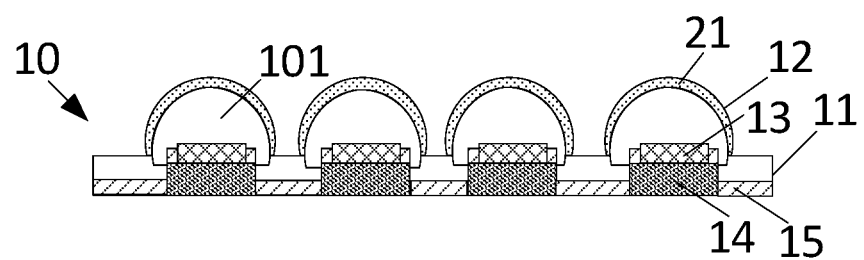
FIG. 5 is a third schematic structural diagram of a backlight module according to the second embodiment of the present disclosure.

In order to improve the utilization of light, as illustrated in FIG. 4, the inner surface of the bottom of the flat portion 11 is provided with a reflective layer 15, an orthographic projection of the reflective layer 15 on the bottom of the flat portion 11 does not overlap with an orthographic projection of the support member on the bottom of the flat portion 11. As illustrated in FIG. 5, in order to further improve the utilization of light, the orthographic projection of the emissive layer 15 on the bottom of the flat portion 11 does not overlap with the orthographic projection of the light bar 13 on the bottom of the flat portion 11. That is, at this time, the reflective layer 15 is also provided at a position on the support member 14 where the light bar is not covered.

Because a height of the light bar is greater than or equal to a height of the flat portion, a light extraction rate can be further increased, a power consumption can be reduced, and heat of the backlight module can be reduced.

Figure 6:
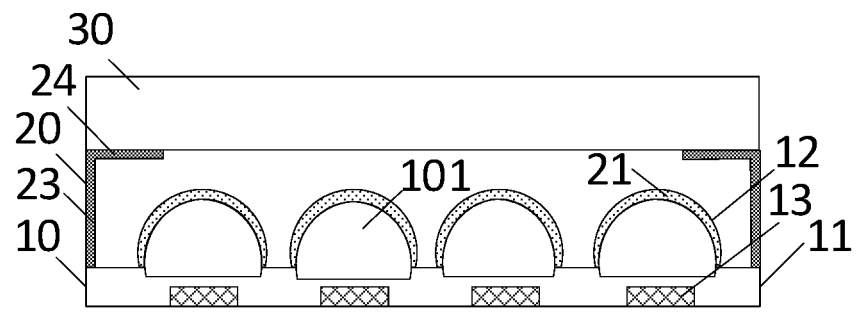
FIG. 6 is a schematic structural diagram of a display device according to an embodiment of the present disclosure.

An embodiment of the disclosure invention also provides a display device. As illustrated in FIG. 6, the display device includes a backlight module 10, and may further include a back frame 20 and a liquid crystal display panel 30.

The back frame 20 is disposed on two sides of the backlight module 10. The back frame 20 includes a vertical portion 23 and a horizontal portion 24, and a bottom end of the vertical portion 23 is fixed on the glass back plate. The horizontal portion 24 is provided at a top end of the vertical portion 23, and the horizontal portion 24 is disposed perpendicular to the vertical portion.

The liquid crystal display panel 30 is disposed on the back frame 20. The liquid crystal display panel 30 is specifically disposed on the horizontal portion 24.

In the embodiment, the backlight module and the display device are provided. The backlight module includes the glass back plate. The glass back plate includes the flat portion and at least one scattering portion disposed on the flat portion. The inner surface of the at least one scattering portion is provided with the diffusion layer. Beneficial effects of an embodiment of the present disclosure are that, because the at least one scattering portion is added on the flat portion and the diffusion layer is disposed on the inner surface of the at least one scattering portion, scattering of a backlight source is facilitated, a light guide plate and an optical film are saved, a process of the backlight module is simplified, and an assembly performance is improved.

In the above, the present disclosure has been disclosed in the above preferred embodiments, but the preferred embodiments are not intended to limit the present disclosure. Various changes and modifications can be made by those skilled in the art without departing from the spirit and scope of the present disclosure. The scope of the present disclosure is defined by the scope of claims.

What is claimed is:

1. A backlight module, comprising:
a glass back plate, comprising:
a flat portion; and
at least one scattering portion disposed on the flat portion, wherein an inner surface of the at least one scattering portion is provided with a diffusion layer;
wherein the backlight module further comprises at least one light bar, and the at least one light bar corresponds to a position of the at least one scattering portion; and
wherein the glass back plate has a receiving cavity, the at least one light bar is disposed in the receiving cavity, and the at least one light bar is fixed on a bottom of the flat portion;
wherein an inner surface of a bottom of the flat portion is provided with a reflective layer, and an orthographic projection of the reflective layer on a bottom of the flat portion does not overlap with an orthographic projection of the at least one light bar on the bottom of the flat portion; wherein the at least one light bar is fixed to the bottom of the flat portion by a support member, and the reflective layer is also provided at a position on the support member where the at least one light bar is not covered.

2. A backlight module, comprising:
a glass back plate, comprising:
a flat portion; and
at least one scattering portion disposed on the flat portion, wherein an inner surface of the at least one scattering portion is provided with a diffusion layer;
wherein the backlight module further comprises at least one light bar; wherein an inner surface of a bottom of the flat portion is provided with a reflective layer, and an orthographic projection of the reflective layer on a bottom of the flat portion does not overlap with an orthographic projection of the at least one light bar on the bottom of the flat portion; wherein the at least one light bar is fixed to the bottom of the flat portion by a support member, and the reflective layer is also provided at a position on the support member where the at least one light bar is not covered.

3. The backlight module according to claim 2, wherein the at least one light bar corresponds to a position of the at least one scattering portion.

4. The backlight module according to claim 3, wherein the glass back plate has a receiving cavity, the at least one light bar is disposed in the receiving cavity.

5. The backlight module according to claim 4, wherein the at least one light bar is fixed on a bottom of the flat portion.

6. The backlight module according to claim 5, wherein a height of the at least one light bar is greater than or equal to a height of the flat portion.

7. The backlight module according to claim 2, wherein the at least one light bar is in one-to-one correspondence with the at least one scattering portion.

8. The backlight module according to claim 2, wherein a cross-sectional shape of the least one scattering portion comprises at least one of a semicircular shape and an elliptical shape.

9. A display device comprising the backlight module of claim 2.

10. The display device circuit according to claim 9, further comprising a back frame and a liquid crystal display panel, wherein the back frame is disposed on two sides of the backlight module, and the liquid crystal display panel is disposed on the back frame.

\* \* \* \* \*